United States Patent
Gluch et al.

(10) Patent No.: US 11,434,158 B2
(45) Date of Patent: Sep. 6, 2022

(54) TECHNOLOGICAL SYSTEM FOR DEGASSING WATER FOR CONSUMPTION

(71) Applicant: ID'EAU SP. Z O. O., Zernica OT (PL)

(72) Inventors: Miroslaw Gluch, Katowice (PL); Jan Karch, Piekary Slaskie (PL); Czeslaw Spyra, Mikolow (PL)

(73) Assignee: ID'EAU SP. Z O.O., Zernica (PL)

( * ) Notice: Subject to any disclaimer, the term of this patent is extended or adjusted under 35 U.S.C. 154(b) by 44 days.

(21) Appl. No.: 16/399,776

(22) Filed: Apr. 30, 2019

(65) Prior Publication Data

US 2019/0337831 A1    Nov. 7, 2019

(30) Foreign Application Priority Data

May 2, 2018   (PL) .......................................... 425449

(51) Int. Cl.
*C02F 9/00* (2006.01)
*C02F 1/00* (2006.01)
(Continued)

(52) U.S. Cl.
CPC ............... *C02F 9/00* (2013.01); *C02F 1/004* (2013.01); *C02F 1/20* (2013.01); *C02F 1/481* (2013.01); *C02F 1/78* (2013.01); *C02F 2209/40* (2013.01)

(58) Field of Classification Search
CPC .. C02F 1/004; C02F 1/20; C02F 1/481; C02F 1/78; C02F 9/00; C02F 2209/40;
(Continued)

(56) References Cited

U.S. PATENT DOCUMENTS 5,545,330 A * 8/1996 Ehrlich ..................... C02F 1/20
                                                        210/703
5,989,427 A   11/1999 Ellard et al.
(Continued)

FOREIGN PATENT DOCUMENTS

CA   2672316 C    1/2011
CN   106830563 A  6/2017
(Continued)

OTHER PUBLICATIONS

WO 2017219892 A1 English description, Dec. 2017, Ding Nanhua et al.*
(Continued)

*Primary Examiner* — Akash K Varma
(74) *Attorney, Agent, or Firm* — Cherskov Flaynik & Gurda, LLC

(57) ABSTRACT

A system for degassing water is described. It uses multiple stages starting with an aerator connected to a number of pumps which conveys water to various filters and tanks. The water is received in at least one buffer tank for de-ironed water which is connected to a fourth tank which can include an ozonization system. At least one buffer tank is connected to a water pressure degassing system pumps water to a fifth tank fitted with a vent and a relief system. This fifth water tank is connected to an aeration pump having an air sterilizer and the aeration pump. It is connected to a parallel system comprising an inflow collector, flow meters, flow regulating valves, at least one aeration tank having permanent magnets, pipes and an outflow collector which is connected to a final tank and filter from which water is fed into a bottling machine.

8 Claims, 1 Drawing Sheet

(51) Int. Cl.
  *C02F 1/20* (2006.01)
  *C02F 1/48* (2006.01)
  *C02F 1/78* (2006.01)
(58) Field of Classification Search
  CPC ........ C02F 1/001; C02F 1/00; C02F 2209/06;
       C02F 7/00; B01D 19/00; B01D 61/58;
       D03D 47/00
  USPC .......................................................... 210/109
  See application file for complete search history.

(56) References Cited

U.S. PATENT DOCUMENTS

| | | | |
|---|---|---|---|
| 9,693,538 B2 | 7/2017 | Stiles, Jr | |
| 2011/0064824 A1* | 3/2011 | Lascoste | A61P 9/00 424/613 |
| 2014/0261213 A1* | 9/2014 | Stiles, Jr. | A01K 63/042 119/245 |
| 2016/0096745 A1 | 4/2016 | Peterson et al. | |
| 2019/0127253 A1 | 5/2019 | Thomas et al. | |

FOREIGN PATENT DOCUMENTS

| | | | | |
|---|---|---|---|---|
| EP | 2727883 A1 | 5/2014 | | |
| EP | 2727883 B1 * | 7/2018 | ................ | C02F 1/20 |
| JP | H1094798 A | 4/1998 | | |
| RU | 2013104518 A | 8/2014 | | |
| RU | 2591937 C1 | 7/2016 | | |
| WO | WO 2017/089988 A1 * | 6/2017 | ................ | C02F 1/66 |
| WO | 2017219892 A1 | 12/2017 | | |
| WO | WO 2017/219892 A1 * | 12/2017 | ................ | C02F 9/04 |

OTHER PUBLICATIONS

WO 2017/089988 A1 English description, Jun. 2017, Thomas, Jean et al.*

Liliana Nogala, Polish Patent Office Search Results, dated Jan. 13, 2021.

Magdalena Stepaniuk, Polish Patent Office Search Results, dated Sep. 5, 2019.

* cited by examiner

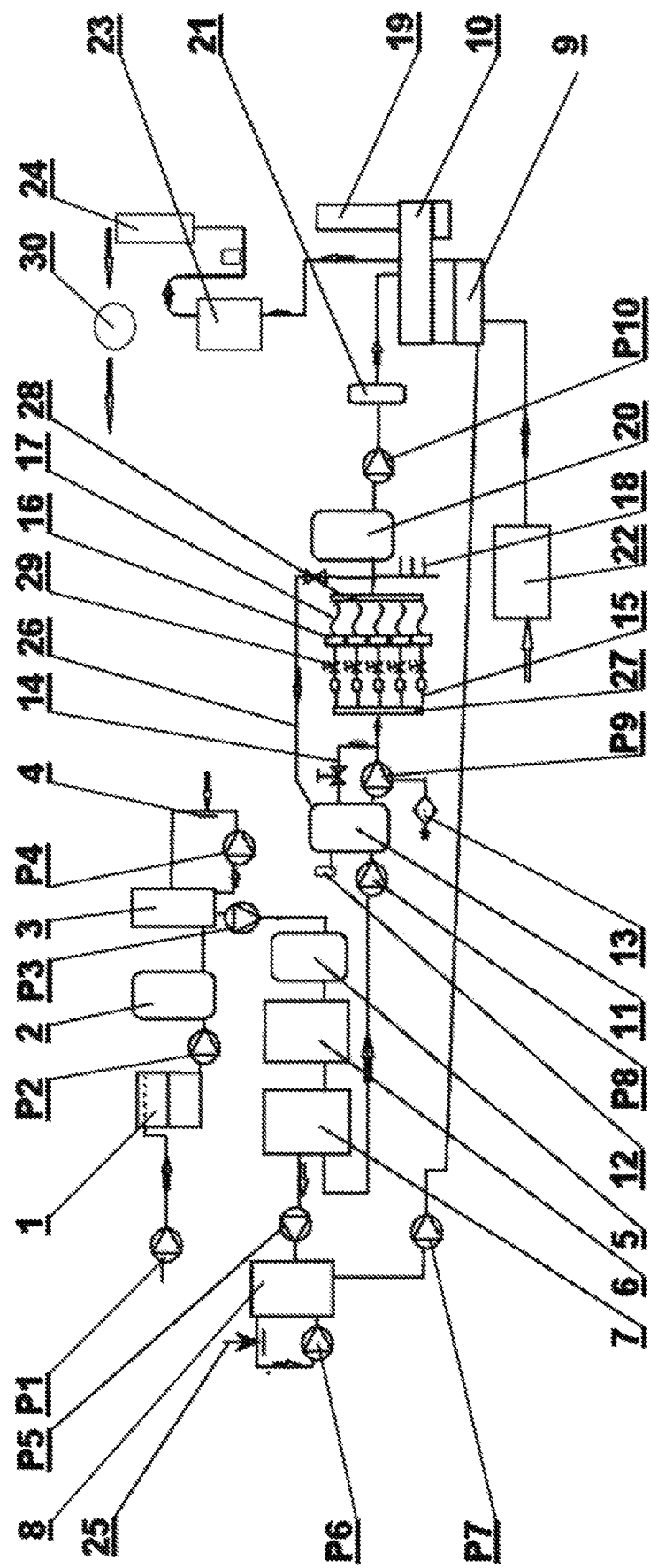

TECHNOLOGICAL SYSTEM FOR DEGASSING WATER FOR CONSUMPTION

CROSS REFERENCE TO RELATED APPLICATIONS

This application claims the benefit of priority to Polish patent application P.425449, filed on May 2, 2018, presently pending, the contents of which is hereby incorporated by reference.

BACKGROUND OF THE INVENTION

1. Field of the Invention

The subject matter of the invention is a technological system for degassing water for consumption, which guarantees obtaining water with a pH increased to approximately 8.

2. Background of the Invention

There are generally known technological systems designed for bottling drinking water obtained from abyssal water intakes where, prior to being bottled or poured into other containers for commercial use, water is subject to filtration to remove any solid, liquid and gaseous impurities until it achieves safe parameters compliant with the standards admitting water to the market. In addition, water can also be subject to other processes, such as: de-ironing, demanganization upon aeration, as well as the processes of partial or complete removal of gases impermanently dissolved in water.

The purpose of the invention is to develop a technological system for effective $CO_2$ removal from water and for blocking $CO_2$ re-dissolution by means of water structuring using intense aeration under pressure, which results in permanent dissolution of oxygen in concentration ranging between 13 mg/l and 18 mg/l and pH value change to approximately 8.0.

A need exists in the art for a means that can improve the quality of bottled water. A need also exists for a means to effectively filter and prepare water for bottling.

SUMMARY OF INVENTION

The purpose of the invention has been achieved by the development of a technological system for degassing water for consumption, obtained from an abyssal well through a deep-well pump or from similar intakes.

The water is pre-treated in a conventional water treatment station containing an aerator connected to a pump. The pre-treatment is followed by a first filter and a first tank and a pump and another filter followed by at least one buffer tank for de-ironed water. This is connected to a pump delivering water to a tank which is favorably equipped with an ozonization system. There is a pump at the end of the tank which feeds water to a bottle washer, with the final stage being pouring water into washed out bottles that are then capped in a capper and delivered to a labelling machine. After being labelled and overprinted with a batch number and a "best before" date, the bottles are moved, arranged properly and wrapped in a shrink wrap machine, and then placed in cardboard boxes and on pallets.

The system is characterized in that it comprises an aerator connected to a pump followed by a filter and a tank, a pump and a filter followed by at least one buffer tank for de-ironed water which is connected to a pump delivering water to a tank which is favorably equipped with an ozonization system, where there is a pump at the end of the tank which feeds water to a bottle washer, and in addition the buffer tank for de-ironed water is connected to a water pressure degassing system comprising a pump and a tank for water before degassing fitted with a vent and a relief system, where the water tank is connected to an aeration pump with an air sterilizer connected to it and the aeration pump is connected to a parallel system comprising an inflow collector, flow meters, flow regulating valves, tanks with permanent magnets, relaxation pipes and an outflow collector which is connected to a tank for water after degassing followed by a pump and a fine filter from which water is fed into a bottling machine and known capping, labelling, shrink wrapping and palletizing machines.

Water from the tank before degassing is sucked in by the pump maintaining a stable level inside the tank. Water and air are sucked in by the pump freely and compressed by the pump to higher pressures, preferably exceeding 5 bar. The inflow collector is connected to many parallel lines, preferably with five or six lines provided with the flow meters, the tanks with permanent magnets, the flow regulating valves and extended relaxation pipes connected to the outflow collector. Behind the outflow collector, there is a system for measuring water parameters together with an automatic valve guiding water to the tank for water before degassing or to the tank for water ready for bottling. The system is provided preferably with four interstage flow regulating valves. The relaxation pipes are a minimum of 10 m long. The system is designed for degassing water, irrespective of its mineralization, preferably within the range of 100 mg/l and 1000 mg/l of dissolved constituents.

The advantage of the technological system for degassing water for consumption is, beside $CO_2$ removal from water and blocking $CO_2$ re-dissolution, is the possible application of this solution to the aeration of breeding ponds and their degassing by lowering the freezing temperature as well as its application to cultivations sensitive to low temperatures.

BRIEF DESCRIPTION OF THE DRAWINGS

The invention together with the above and other objects and advantages will be best understood from the following detailed description of the preferred embodiment of the invention shown in the accompanying drawing, wherein:

FIG. 1 depicts a schematic view of one embodiment of the invention.

DETAILED DESCRIPTION OF THE INVENTION

The subject matter of the invention being the technological system for degassing water for consumption is shown in a drawing as a flow diagram.

As shown in the drawing, using known processes in the water bottling plants, water is pumped by the pump P1 from the water intake to the processing plant to the aerator 1, where water is aerated. The aerated water is fed by the pump P2 to the sand filter 2 which separates coagulated iron. After this treatment water is de-ironed and hydrogen sulfide has been removed from it. The water still contains dissolved carbon dioxide and oxygen. The reason for this is that it is done under atmospheric pressure conditions or under slight negative pressure induced by an exhaust fan in the aerator 1.

After the sand filter 2, water flows into the tank 3. In some embodiments, the line is disinfected using ozone, water in the tank 3 becomes enriched with ozone through the nozzle 4 and the circulation pump P4, where the nozzle 4 is set at its full flow capacity, while the inflow of ozone is completely shut during the water production process.

The pump P3 guides water to the sand filter 5 and then to two water tanks 6 and 7 after de-ironing, whereas the pump P5 pumps water into the tank 8 provided with the rinsing water ozonization system 25, where the circulation pump P6 and ozone inflow are set the their maximum capacity and water is being prepared for pumping by the pump P7 into the bottle washer 9.

The technological system for degassing water for consumption is designed for degassing water, irrespective of the level of its mineralization, preferably within the range of 100 mg/l and 1000 mg/l of dissolved constituents, with the task of putting water to further treatment intended to prepare water in such a manner that it is free from residual $CO_2$ and protected against $CO_2$ re-dissolution being blocked by dissolved oxygen, guides water not containing ozone from the buffer tank 7 by means of the pump P8. The water is conveyed to the tank 11 for water before degassing maintaining its level automatically. The water tank 11 is fitted with a vent 12. Water from the tank 11 for water before degassing is sucked in by the pump P9 which simultaneously sucks in, in a controlled manner, the air filtered and sterilized in the sterilizer 13, and the air dissolving under specific flow overpressure conditions partially displaces in water the $CO_2$ which is released by directing part of the stream through the bleed pipe 14. In one embodiment, the pipe is always open but with adjustable flow and through the relief pipe 26. Water from the inflow collector 27 flowing at the defined rate and pressure through the flow meter 15, the flow regulating valves 29, the tanks 16 with permanent magnets and the extended relaxation pipes 17 minimum 10 m long and the outflow collector 28 continues to be oxygenated with $O_2$ displacing $CO_2$. At this stage, the process is monitored by the measuring system 18 controlling the aeration parameter—within the range of 20 mg/l and 40 mg/l with pH ranging between 7.7 and 8.0 or higher, which indicates degassing quality. Oxygen dissolution in water is more intense during aeration under specific pressure conditions at the individual stages of the process and the volumes of the air mixing with water than the dissolution of other gases, such as nitrogen or $CO_2$. Upon achieving set water parameters, water is guided to the tank 20 for water after degassing by the pump P10 through the 0.02 μm fine filter 21, where undissolved gases are removed, simultaneously and automatically, through the vent.

After this production phase, water is delivered to the known bottling machine 10—which is simultaneously supplied with bottles blown from pre-molds in the blowing machine 22—where water is poured into the bottles pre-washed with water and ozone, which then are capped in the capper 19. After pouring water into the bottles/containers, the poured water level and the level of dissolved air and pH are checked. Capped bottles/containers are transported by a conveyor to the labelling machine 23 from where, after being labelled and overprinted with a batch number and "best before" date, they are moved and arranged and film wrapped in the shrink wrap machine 24, and then they are placed in cardboard boxes and on the pallets 30.

In summary, the subject matter of the invention is a technological system for degassing water for consumption, which guarantees obtaining water with a pH increased to approx. 8. The system comprises an aerator (1) connected to a pump (P2) followed by a filter (2) and a tank (3) and a pump (P3) and a filter (5) followed by at least one buffer tank (6) and (7) for de-ironated water which is connected to a pump (P5) delivering water to the tank (8) which is favorably equipped with an ozonization system (25). There is a pump (P7) at the end of the tank (8) which feeds water to a bottle washer (10), and in addition the buffer tank (6) and (7) for de-ironated water is connected to a water pressure degassing system comprising a pump (P8) and a tank (11) for water before degassing fitted with a vent (12) and a relief system (26). The water tank (11) is connected to an aeration pump (P9) with an air sterilizer (13) connected to it and the aeration pump is connected to the system comprising an inflow collector (27), flow meters (15), flow regulating valves (29), tanks (16) with permanent magnets, relaxation pipes (17) and an outflow collector (28) which is connected to a tank (20) for water after degassing followed by a pump (P10) and a fine filter (21) from which water is fed into a bottling machine and known capping, labelling, shrink wrapping and palletizing machines.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The invention claimed is:

1. A system for degassing water, comprising:
   an aerator connected to a first pump which conveys water by a first filter and a first tank,
   a second pump and a second filter which conveys water to at least one buffer tank for de-ironed water which is in fluid communication with
   a third pump thereby delivering water to a fourth tank which is favorably equipped with an ozonization system;
   a fourth pump at one end of the fourth tank which feeds water to a bottle washer, and
   in addition the at least one buffer tank for de-ironed water is in fluid communication with a water pressure degassing system comprising:
   a fifth pump and a fifth tank for water before degassing fitted with a bleed pipe and a relief system, where the fifth tank is connected to an aeration pump having an air sterilizer wherein said aeration pump sucks in sterilized air creating a high-pressure combination of water from the fifth tank and sterilized air and wherein the high-pressure of the combination exceeds 5 bar and displaces dissolved $CO_2$ in the water which exits through the bleed pipe, the fifth tank is connected to a parallel tank system wherein the parallel tank system comprises an inflow collector, flow meters, flow regulating valves, multiple aeration tanks containing permanent magnets with pipes extending from the multiple aeration tanks to an outflow connector and wherein the parallel tank system directs water from the fifth tank to the multiple aeration tanks containing the permanent magnets, the extended pipes and the outflow collector which is connected to a singular sixth tank connected to a sixth pump and a fine filter from which water is fed into a bottling machine; wherein the system maintains sufficient air pressure to displace the dissolved $CO_2$ in the water.

2. The system according to claim 1, wherein water from the fifth tank is conveyed in by the fifth pump in order to maintain a stable quantity of water inside the fifth tank.

3. The system according to claim 1, wherein water and sterilized air on a suction side of the aeration pump are at environmental pressure due to a presence of the bleed pipe on the fifth tank, and compressed by the aeration pump to higher pressures, preferably exceeding the 5 bar.

4. The system according to claim 1, wherein the multiple aeration tanks comprise five parallel tanks.

5. The system according to claim 1, wherein in fluid communication with the outflow collector, is a system for measuring water parameters together with an automatic valve guiding water to the fifth tank for water before degassing or to the sixth tank for water ready for bottling.

6. The system according to claim 1, wherein the flow regulating valves comprise five inter-stage flow regulating valves.

7. The system according to claim 4, wherein each extended relaxation pipe is at least 10 m long.

8. The system according to claim 1, wherein input water to the system is processed regardless of its mineralization, preferably within a range of 100 mg/l and 1000 mg/l of dissolved constituents.

* * * * *